US010721743B2

(12) United States Patent
Chen et al.

(10) Patent No.: US 10,721,743 B2
(45) Date of Patent: Jul. 21, 2020

(54) PHYSICAL UPLINK CONTROL MANAGEMENT IN LTE/LTE-A SYSTEMS WITH UNLICENSED SPECTRUM

(71) Applicant: QUALCOMM Incorporated, San Diego, CA (US)

(72) Inventors: Wanshi Chen, San Diego, CA (US); Aleksandar Damnjanovic, Del Mar, CA (US); Srinivas Yerramalli, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 15/954,497

(22) Filed: Apr. 16, 2018

(65) Prior Publication Data

US 2018/0242328 A1 Aug. 23, 2018

Related U.S. Application Data

(62) Division of application No. 14/492,437, filed on Sep. 22, 2014, now Pat. No. 9,949,275.

(Continued)

(51) Int. Cl.
*H04W 72/04* (2009.01)
*H04W 72/08* (2009.01)
(Continued)

(52) U.S. Cl.
CPC ........... *H04W 72/082* (2013.01); *H04L 5/001* (2013.01); *H04L 5/0053* (2013.01);
(Continued)

(58) Field of Classification Search
CPC .......... H04W 72/082; H04W 72/0413; H04W 74/0808; H04W 72/042; H04W 16/14;
(Continued)

(56) References Cited

U.S. PATENT DOCUMENTS

2010/0279628 A1* 11/2010 Love ................. H04L 5/003
455/70
2011/0205986 A1 8/2011 Medapalli
(Continued)

FOREIGN PATENT DOCUMENTS

CN 102098086 A 6/2011
CN 102438319 A 5/2012
(Continued)

OTHER PUBLICATIONS

International Search Report and Written Opinion—PCT/US2014/056989—ISA/EPO—dated Dec. 17, 2014.
(Continued)

*Primary Examiner* — Lan-Huong Truong
(74) *Attorney, Agent, or Firm* — Liem T. Do

(57) ABSTRACT

Uplink control channel management is disclosed for LTE/LTE-A communication systems with unlicensed spectrum in which two or more physical resource blocks (PRBs) are allocated for uplink control channel transmission. The uplink control information (UCI) payload may be determined based on clear channel assessment (CCA) information associated with carriers scheduled for transmission of the UCI data. With the UCI payload determined, two or more uplink control channel messages may be generated according to at least one control channel format, wherein uplink control channel messages include the UCI payload. These generated uplink control channel messages may then be transmitted over the allocated PRBs.

12 Claims, 11 Drawing Sheets

Related U.S. Application Data

(60) Provisional application No. 61/885,348, filed on Oct. 1, 2013.

(51) Int. Cl.
*H04L 5/00* (2006.01)
*H04W 16/14* (2009.01)
*H04L 5/14* (2006.01)
*H04W 74/08* (2009.01)

(52) U.S. Cl.
CPC .......... *H04L 5/0094* (2013.01); *H04L 5/0023* (2013.01); *H04L 5/0048* (2013.01); *H04L 5/14* (2013.01); *H04W 16/14* (2013.01); *H04W 72/042* (2013.01); *H04W 72/0413* (2013.01); *H04W 74/0808* (2013.01)

(58) Field of Classification Search
CPC ..... H04L 5/0094; H04L 5/0053; H04L 5/001; H04L 5/14; H04L 5/0048; H04L 5/0023
See application file for complete search history.

(56) References Cited

U.S. PATENT DOCUMENTS

| | | |
|---|---|---|
| 2011/0242997 A1 | 10/2011 | Yin |
| 2011/0310986 A1* | 12/2011 | Heo ........................ H04L 5/001 375/259 |
| 2013/0176929 A1 | 7/2013 | Yang et al. |
| 2013/0223297 A1* | 8/2013 | Zhang .................... H04L 1/1861 370/280 |
| 2014/0029561 A1 | 1/2014 | Kim et al. |
| 2015/0092702 A1 | 4/2015 | Chen et al. |

FOREIGN PATENT DOCUMENTS

| | | |
|---|---|---|
| EP | 2584845 A2 * | 4/2013 |
| EP | 2701320 A2 | 2/2014 |
| GB | 2494132 A | 3/2013 |
| WO | WO-2011122712 A1 | 10/2011 |
| WO | WO-2012051303 A1 | 4/2012 |
| WO | 2012078565 A1 | 6/2012 |
| WO | 2012141463 A2 | 10/2012 |
| WO | 2012144823 A2 | 10/2012 |
| WO | WO-2013023377 A1 | 2/2013 |

OTHER PUBLICATIONS

Panasonic: "PUCCH Resource Allocation for Carrier Aggregation", 3GPP Draft; R1-100363, 3rd Generation Partnership Project (3GPP), Mobile Competence Centre; 650, Route Des Lucioles; F-06921 Sophia-Antipolis Cedex; France, vol. RAN WG1, No. Valencia, Spain; Jan. 18, 2010, Jan. 12, 2010, XP050418026, [retrieved on Jan. 12, 2010], 7 pages.

Panasonic: "PUCCH Resource Allocation Schemes for Carrier Aggregation", 3GPP Draft; R1-093943, 3rd Generation Partnership Project (3GPP), Mobile Competence Centre; 650, Route Des Lucioles; F-06921 Sophia-Antipolis Cedex; France, No. Miyazaki; Oct. 12, 2009, Oct. 12, 2009, XP050388443, [retrieved on Oct. 6, 2009], 2 pages.

* cited by examiner

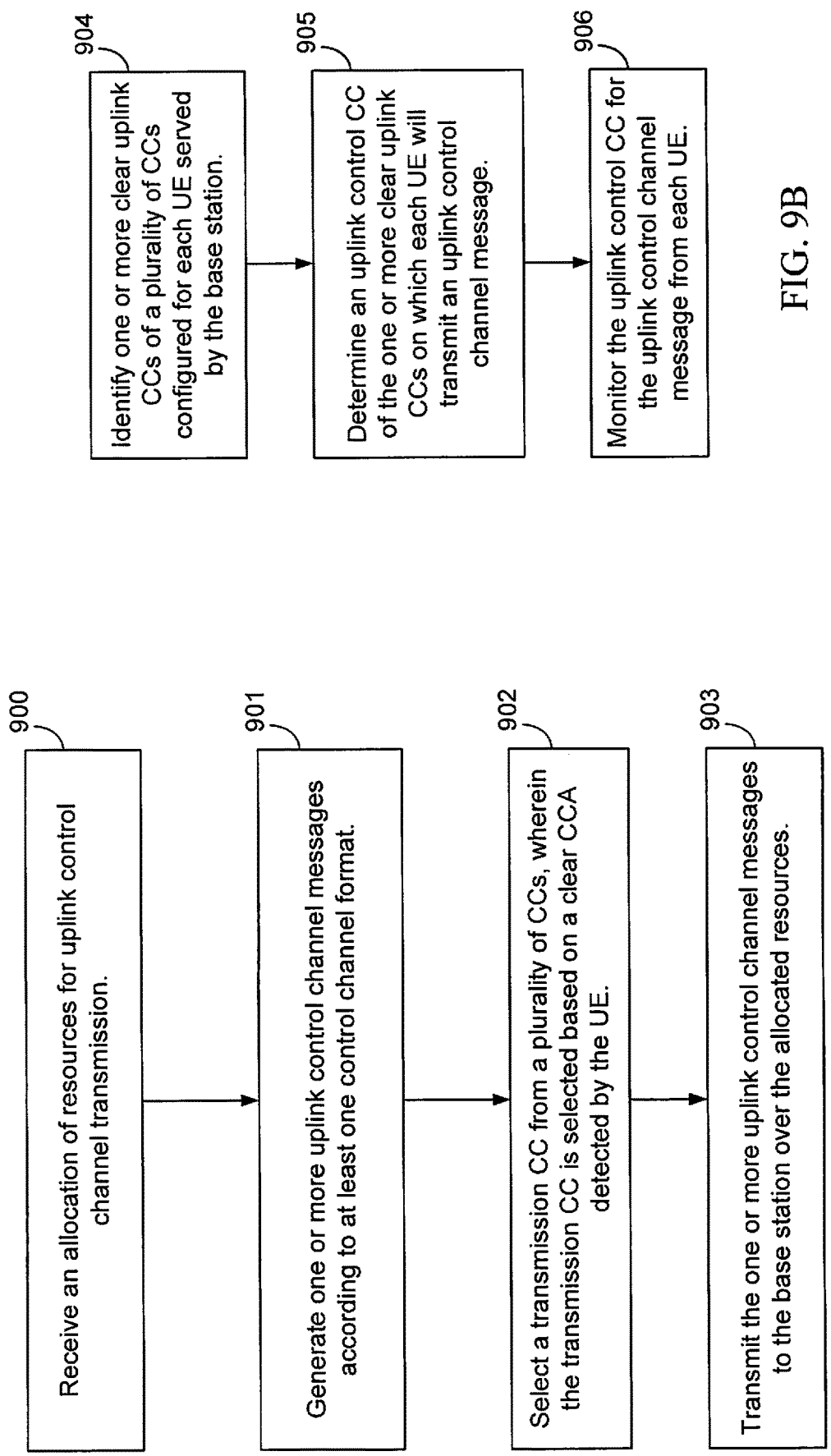

PHYSICAL UPLINK CONTROL MANAGEMENT IN LTE/LTE-A SYSTEMS WITH UNLICENSED SPECTRUM

CROSS-REFERENCE TO RELATED APPLICATIONS

This application is a division of U.S. patent application Ser. No. 14/492,437, entitled "PHYSICAL UPLINK CONTROL MANAGEMENT IN LTE/LTE-A SYSTEMS WITH UNLICENSED SPECTRUM," filed on Sep. 22, 2014, which claims the benefit of U.S. Provisional Patent Application No. 61/885,348, entitled, "PHYSICAL UPLINK CONTROL MANAGEMENT IN LTE-U SYSTEMS," filed on Oct. 1, 2013, which is expressly incorporated by reference herein in its entirety.

BACKGROUND

Field

Aspects of the present disclosure relate generally to wireless communication systems, and more particularly, to physical uplink control management in long term evolution (LTE)/LTE-Advanced (LTE-A) communication systems with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving, by a UE from a base station, allocation of resources for uplink control channel transmission, determining, at the UE, uplink control information (UCI) based, at least in part, on clear channel assessment (CCA) information associated with one or more carriers configured for the UE, and transmitting, by the UE, the UCI to the base station over the allocated resources.

In an additional aspect of the disclosure, a method of wireless communication includes receiving, by a UE from a base station, allocation of resources for uplink control channel transmission, generating, by the UE, one or more uplink control channel messages according to at least one control channel format, selecting, by the UE, a transmission component carrier (CC) from a plurality of CCs, wherein the transmission CC is selected based on a clear CCA detected by the UE, and transmitting, by the UE, the one or more uplink control channel messages to the base station over the allocated resources.

In an additional aspect of the disclosure, a method of wireless communication includes identifying, by a base station, one or more clear uplink CCs of a plurality of CCs configured for each UE served by the base station, determining an uplink control CC of the one or more clear uplink CCs on which each UE will transmit an uplink control channel message, and monitoring the uplink control CC for the uplink control channel message from each UE.

In an additional aspect of the disclosure, an apparatus configured for wireless communication includes means for receiving, by a UE from a base station, allocation of resources for uplink control channel transmission, means for determining, at the UE, UCI based, at least in part, on CCA information associated with one or more carriers configured for the UE, and means for transmitting, by the UE, the UCI to the base station over the allocated resources.

In an additional aspect of the disclosure, an apparatus configured for wireless communication includes means for receiving, by a UE from a base station, allocation of resources for uplink control channel transmission, means for generating, by the UE, one or more uplink control channel messages according to at least one control channel format, means for selecting, by the UE, a transmission CC from a plurality of CCs, wherein the transmission CC is selected based on a clear CCA detected by the UE, and means for transmitting, by the UE, the one or more uplink control channel messages to the base station over the allocated resources.

In an additional aspect of the disclosure, an apparatus configured for wireless communication includes means for identifying, by a base station, one or more clear uplink CCs of a plurality of CCs configured for each UE served by the base station, means for determining an uplink control CC of the one or more clear uplink CCs on which each UE will transmit an uplink control channel message, and means for monitoring the uplink control CC for the uplink control channel message from each UE.

In an additional aspect of the disclosure, a non-transitory computer-readable medium having program code recorded thereon. This program code includes code to receive, by a UE from a base station, allocation of resources for uplink control channel transmission, code to determine, at the UE, UCI based, at least in part, on CCA information associated with one or more carriers configured for the UE, and code to transmit, by the UE, the UCI to the base station over the allocated resources.

In an additional aspect of the disclosure, a non-transitory computer-readable medium having program code recorded thereon. This program code includes code to receive, by a UE from a base station, allocation of resources for uplink control channel transmission, code to generate, by the UE, one or more uplink control channel messages according to at least one control channel format, code to select, by the UE, a transmission CC from a plurality of CCs, wherein the transmission CC is selected based on a clear CCA detected by the UE, and code to transmit, by the UE, the one or more uplink control channel messages to the base station over the allocated resources.

In an additional aspect of the disclosure, a non-transitory computer-readable medium having program code recorded thereon. This program code includes code to identify, by a base station, one or more clear uplink CCs of a plurality of CCs configured for each UE served by the base station, code to determine an uplink control CC of the one or more clear uplink CCs on which each UE will transmit an uplink control channel message, and code to monitor the uplink control CC for the uplink control channel message from each UE.

In an additional aspect of the disclosure, an apparatus includes at least one processor and a memory coupled to the processor. The processor is configured to receive, by a UE from a base station, allocation of resources for uplink control channel transmission, code to determine, at the UE, UCI based, at least in part, on CCA information associated with one or more carriers configured for the UE, and code to transmit, by the UE, the UCI to the base station over the allocated resources.

In an additional aspect of the disclosure, an apparatus includes at least one processor and a memory coupled to the processor. The processor is configured to receive, by a UE from a base station, allocation of resources for uplink control channel transmission, to generate, by the UE, one or more uplink control channel messages according to at least one control channel format, to select, by the UE, a transmission CC from a plurality of CCs, wherein the transmission CC is selected based on a clear CCA detected by the UE, and to transmit, by the UE, the one or more uplink control channel messages to the base station over the allocated resources.

In an additional aspect of the disclosure, an apparatus includes at least one processor and a memory coupled to the processor. The processor is configured to identify, by a base station, one or more clear uplink CCs of a plurality of CCs configured for each UE served by the base station, to determine an uplink control CC of the one or more clear uplink CCs on which each UE will transmit an uplink control channel message, and to monitor the uplink control CC for the uplink control channel message from each UE.

BRIEF DESCRIPTION OF THE DRAWINGS

FIGS. 9A and 9B are functional block diagrams illustrating example blocks executed to implement one aspect of the present disclosure.

DETAILED DESCRIPTION

Figure 1:
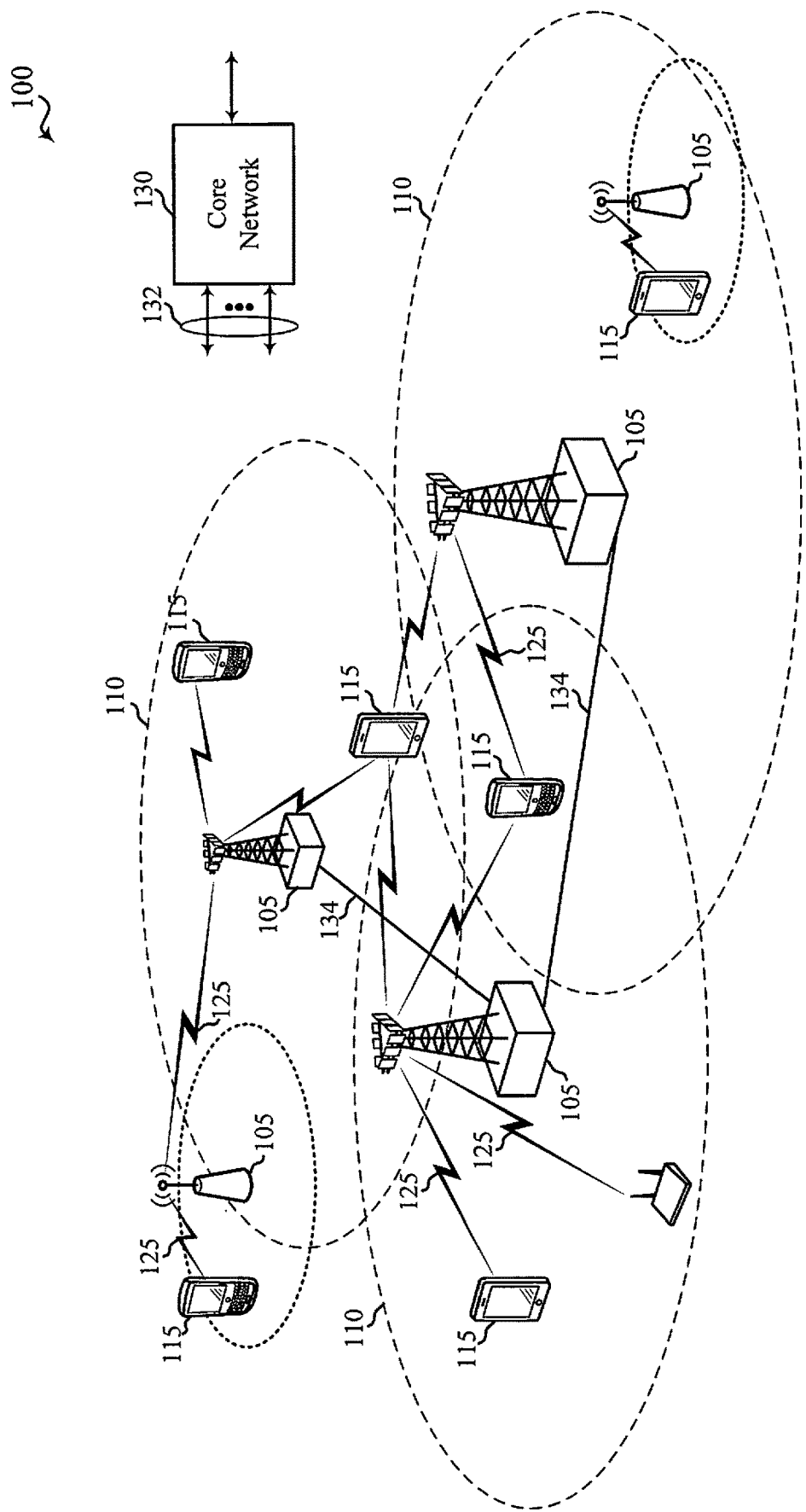
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A in an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A deployment with unlicensed spectrum (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, LTE/LTE-A networks with unlicensed spectrum may operate in a bootstrapped mode in which LTE cells act as anchor and provide relevant unlicensed cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum based on RLC-level aggregation with co-located cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more modes of operation or deployment scenarios capable of communication over unlicensed spectrum. In other embodiments, the system 100 may support wireless communications using an unlicensed spectrum and an access technology different from LTE, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A deployment scenarios or modes of operation with unlicensed spectrum in a system such as the system 100, as well as other features and functions related to the operation of LTE/LTE-A with unlicensed spectrum, are provided below with reference to FIGS. 2A-10.

Figure 2A:
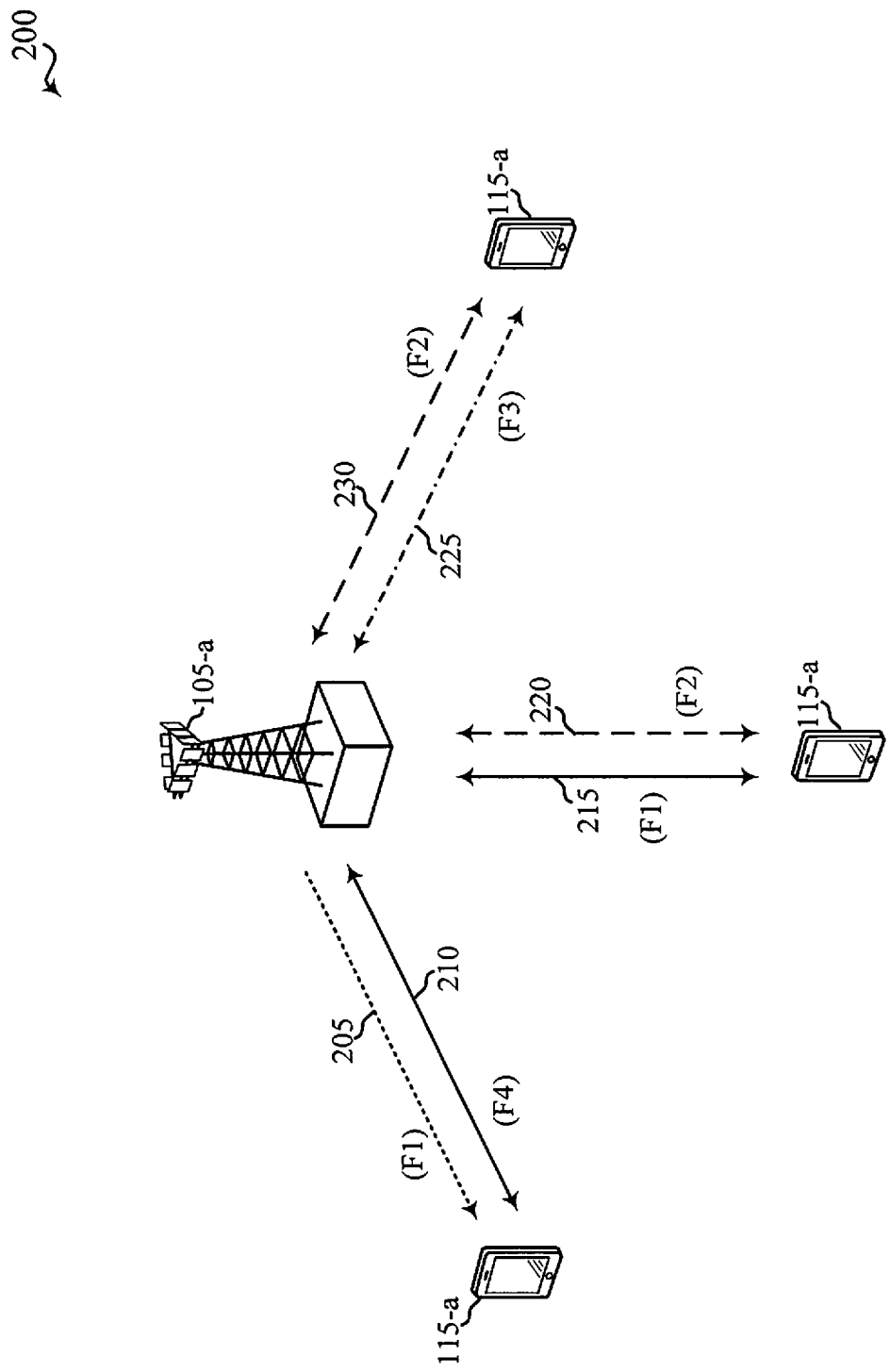
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE network that supports communications over unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the LTE secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
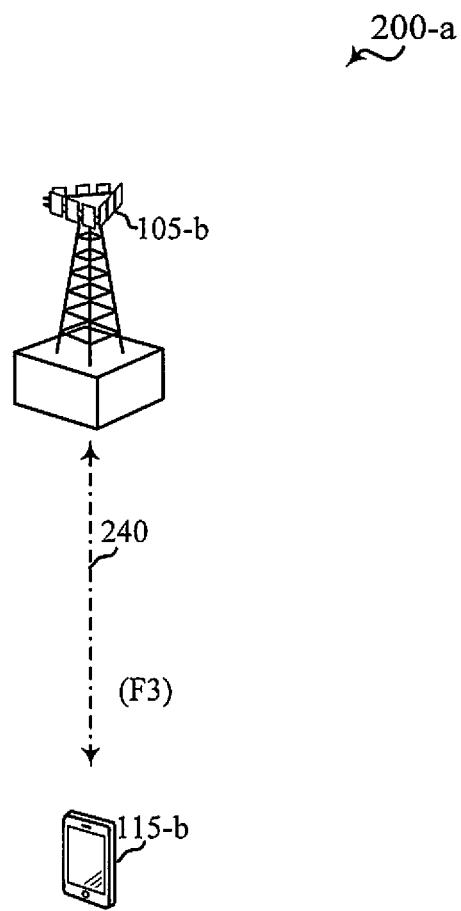
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-b using a bidirectional link 240 and may receive SC-FDMA communications signals from the UE 115-b using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE-U PCC on the unlicensed spectrum. Moreover, LBT may be implemented on both the base station and the UE.

Figure 3:
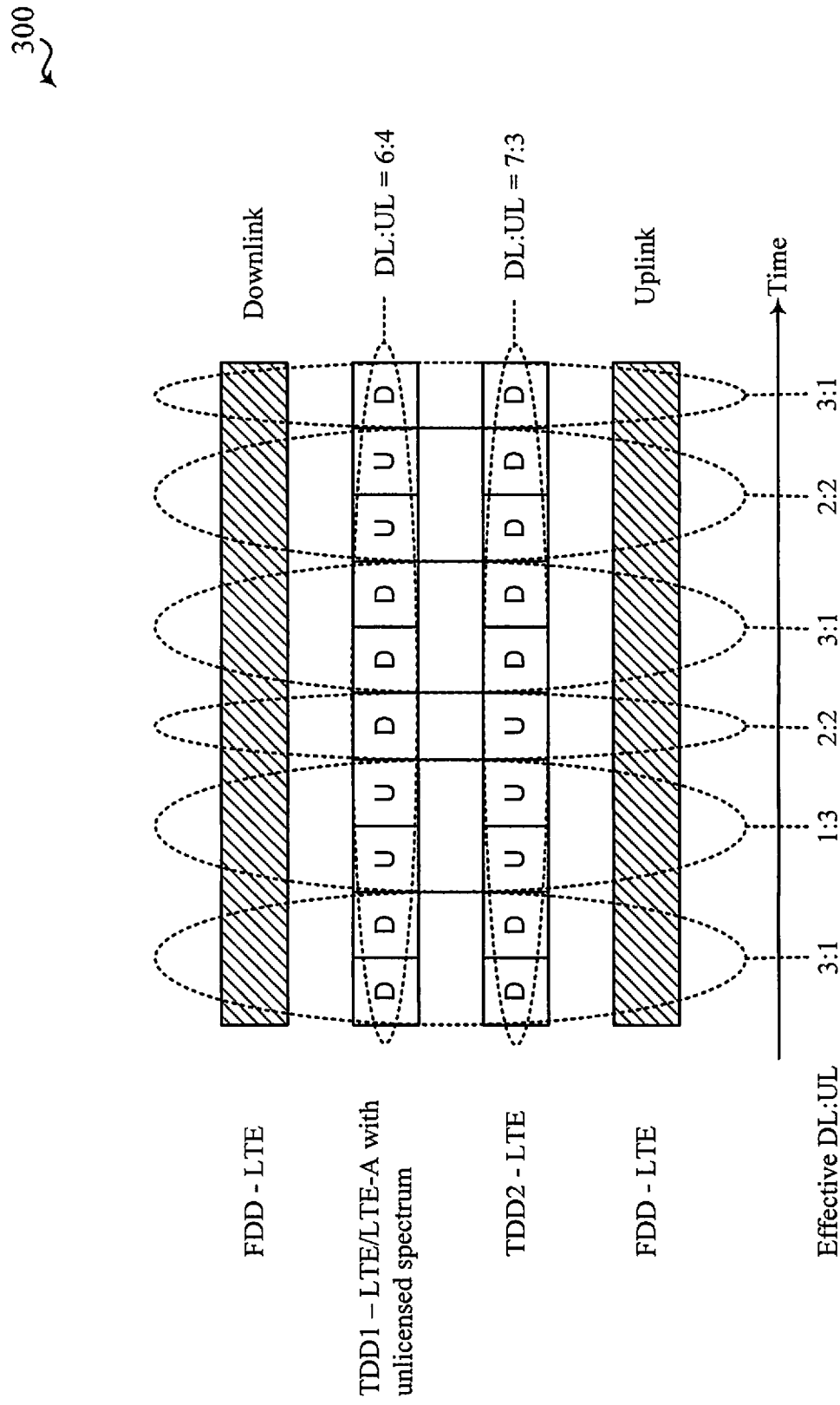
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-a of FIG. 1 and FIG. 2A, respectively, and/or in the UEs 115 and 115-a of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
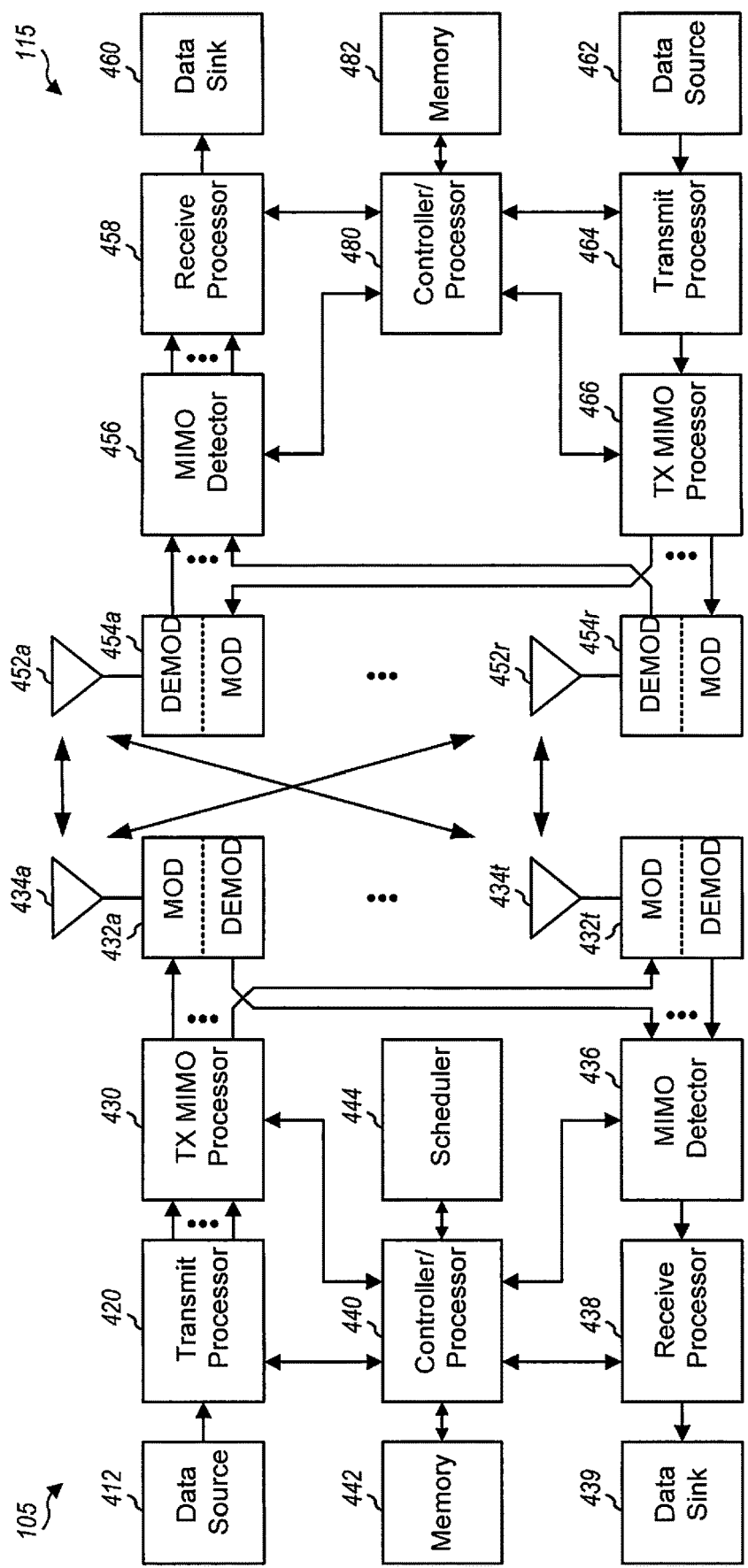
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434a through 434t, and the UE 115 may be equipped with antennas 452a through 452r. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 115, the antennas 452a through 452r may receive the downlink signals from the eNB 105 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 6, 9A, and 9B, and/or other processes for the techniques described herein. The memories 442 and 482 may store data and program codes for the eNB 105 and the UE 115, respectively. A scheduler 444 may schedule UEs for data transmission on the downlink and/or uplink.

Figure 5:
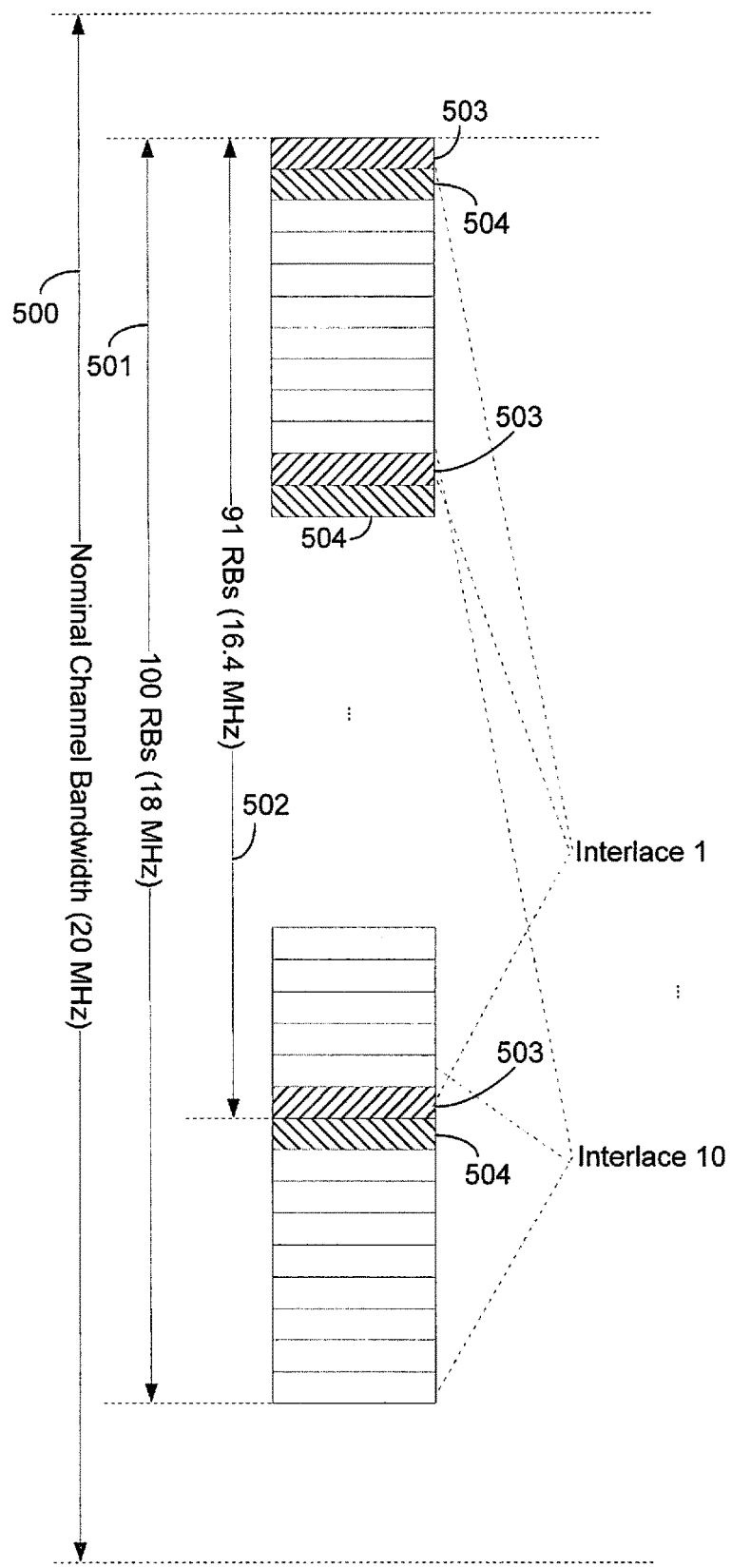
FIG. 5 is a block diagram illustrating an uplink transmission stream configured for multi-cluster SC-FDMA transmissions.

FIG. 5 is a block diagram illustrating an uplink transmission stream configured for multi-cluster SC-FDMA transmissions. A nominal channel bandwidth 500 is illustrated for a 20 MHz LTE/LTE-A deployment with unlicensed spectrum. Actual channel bandwidth 501 represents 100 RBs, which represents an actual usable bandwidth of approximately 18 MHz. In order to be considered occupied channel bandwidth, uplink transmissions should span at least 80% of nominal channel bandwidth 500. Occupied channel bandwidth 502 is illustrated having 91 RBs, representing approximately 16.4 MHz. Thus, for uplink transmissions, including PUCCH transmissions, 10 PUCCH channels may be multiplexed with the minimum interleaving granularity of 10 RBs to successfully meet the occupied bandwidth requirements. Thus, Interlace 1 through Interlace 10, including the interleaving of uplink transmission RBs 503 and 504 across occupied channel bandwidth 502, would meet the occupied bandwidth requirements for unlicensed spectrum in LTE/LTE-A deployments with unlicensed spectrum. For example, in a 20 MHz system, one PUCCH channel could then occupy RBs 0, 10, 20, . . . 90. The 10 RBs over the nominal bandwidth would meet the 80% requirement to be considered an occupied channel bandwidth.

Uplink signals, such as PUCCH and PUSCH signals, are typically based on localized frequency division multiplexing (LFDM) waveforms that occupy a set of subcarriers where a different modulation symbol is sent for each subcarrier or some precoding is done before sending the frequency domain waveform. When using these waveforms, small amounts of data available to be sent result in a small portion of the spectrum is occupied. Because of limitations in transmit power spectral density (TX-PSD), when occupying a small part of the bandwidth a small amount of power is transmitted. As noted above, the occupied bandwidth requirements would suggest that such uplink transmissions may need to occupy a percentage the entire waveform. However, if most of the waveform is occupied and does not leave any unused subcarriers, it may not be possible to multiplex different users for a given amount of bandwidth. The multi-clustering of SC-FDMA signals provides for each transmitter to interleave its signals so that the signals occupy every 1-out-of-every-Nth subcarrier (e.g., 1-out-of-10, 1-out-of-12, and the like), thereby leaving many subcarriers in the middle unoccupied. This multi-cluster SC-FDMA approach may increase the nominal bandwidth occupancy to enable sending the waveform with a higher power (but still with low enough PSD to meet regulations). Interleaved frequency division multiplexing (IFDM) and interleaved orthogonal frequency division multiplexing (I-OFDM) signals may be used that occupy 1-out-of-Nth subcarrier in order to send signals confined to those subcarriers.

PUCCH transmissions scheduled in LTE systems are generally allocated for one physical resource block (PRB) occupying one resource block (RB) in each slot, using mirror hopping across the two slots within a subframe. There are three categories of PUCCH format are currently supported in LTE communications systems: PUCCH format 1/1a/1b, PUCCH format 2/2a/2b, and PUCCH format 3. PUCCH format 1/1a/1b is primarily configured to deliver scheduling request (SR) and HARQ acknowledgment (ACK)/negative acknowledgement (NAK) information. In PUCCH format 1/1a/1b, each PUCCH channel may carry 1 or 2 bits of ACK/NAK information and, potentially, a 1-bit SR transmission. Moreover, each RB in a format 1/1a/1b transmission is capable of multiplexing up to 36 PUCCH channels. While 36 PUCCH channels is the maximum multiplexing capability in format 1/1a/1b, in practice, format 1/1a/1b PUCCH transmissions multiplex with much fewer channels (e.g., 8, 10, 12, etc.). Accordingly, while each PUCCH format 1/1a/1b channel may only carry up to 2 bits, with its multiplexing capabilities, the total capacity for PUCCH format 1/1a/1b is much higher.

PUCCH format 2/2a/2b is primarily configured to carry channel state information (CSI) with some additional ACK/NAK. Each format 2/2a/2b channel may carry 20 coded bits for CSI feedback along with 0/1/2-bits ACK/NAK. PUCCH format 2/2a/2b includes multiplexing capabilities for each RB of up to 12 channels.

PUCCH format 3 is primarily configured to accommodate carrier aggregation (CA) implementations. One consequence of CA is an increased number of ACK/NAK bits for the multiple component carriers (CCs). The additional ACK/NAK payload was not generally compatible with the existing capacities of formats 1/1a/1b or 2/2a/2b. Each of the channel carriers for format 3 may carry up to 10-bits in FDD or 20-bits in TDD for ACK/NAK, with up to 1-bit for SR, and/or up to 11-bits for CSI feedback.

LTE/LTE-A system deployments with unlicensed spectrum offer additional features that may cause issues for current LTE PUCCH standards. For example, LTE/LTE-A with unlicensed spectrum offers a potential large number of CCs, larger even than CA implementations, which may increase total potential ACK/NAK payload for multiple individual ACK/NAK responses or group ACK/NAK. However, in addressing LBT requirements for CCs in unlicensed bands, the potential ACK/NAK payload may be variable from subframe to subframe, depending on the results of CCA checks. These features in addition to the presence/absence of other uplink control information may not be compatible with current PUCCH standards.

Figure 6:
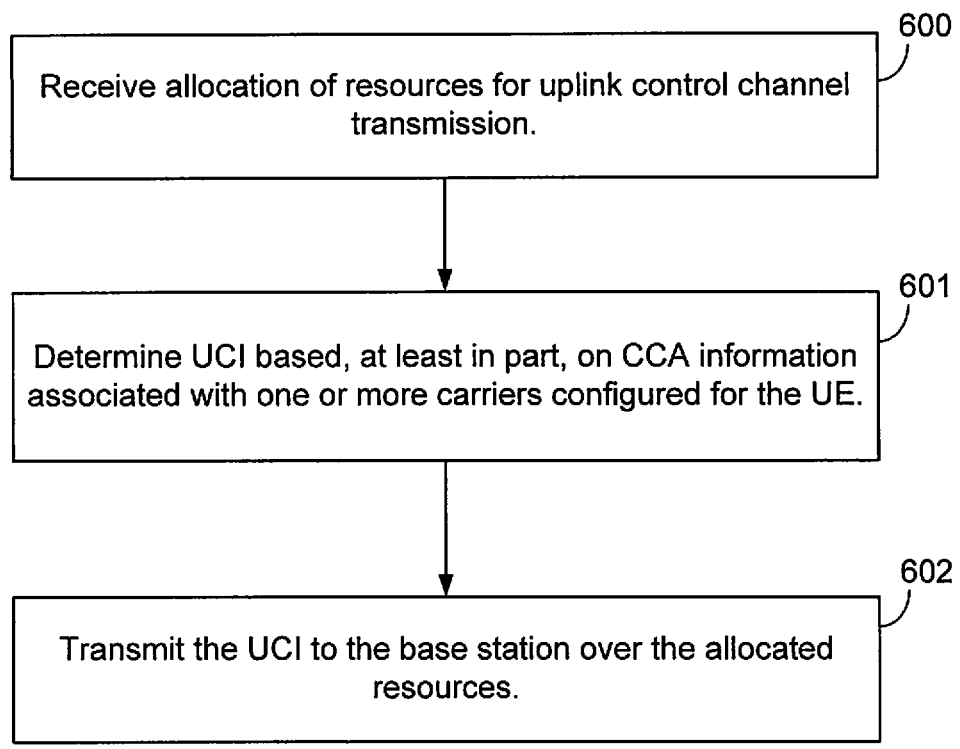
FIG. 6 is a functional block diagram illustrating example blocks executed to implement one aspect of the present disclosure.

Various aspects of the present disclosure are directed to updating PUCCH handling for LTE/LTE-A system deployments with unlicensed spectrum. FIG. 6 is a functional block diagram illustrating example blocks executed to implement one aspect of the present disclosure. At block 600, a UE receives an allocation from a base station or more generally a node (including possibly another UE) of resources for uplink control channel transmission. Because of the increased potential payload due to the LTE/LTE-A with unlicensed spectrum carrier along with the occupied channel bandwidth requirements for PUCCH transmissions, the single PRB allocation for current LTE PUCCH transmissions may be insufficient. As such, LTE PUCCH over unlicensed spectrum may be allocated for multiple PRBs (M) when necessary.

At block 601, the UE determines the uplink control information (UCI) based, at least in part, on the CCA information associated with one or more carriers configured for the UE. Alternatively, the uplink control information (UCI) may be determined based on a configured number of CCs and/or a downlink transmission mode of each configured CC, even if a clear CCA is not checked for a CC. UCI data, which may include ACK/NAK, SR, and/or CQI information. The UCI information may be scheduled for transmission. However, the actual payload size depends on which carriers receive clear CCA checks. The UE may determine the actual payload size after detecting which carriers are clear for transmission and which are not.

At block 602, the UE transmits the UCI to the base station over the allocated resources. In transmitting the PUCCH according to the various aspects of the present disclosure, different structures for the PUCCH may be employed. In one example, parallel multiple PUCCH transmissions may be used. In such parallel transmissions, each transmission may be based on existing PUCCH formats (e.g., PUCCH 1/1a/1b, PUCCH 2/2a/2b, etc.)

The UE may generate multiple uplink control channel messages according to at least one control channel format, wherein the uplink control channel messages include K UCI bits. The UE may generate the requisite uplink control channel messages, such as PUCCH messages, according to a particular PUCCH format, whether one of the existing formats, such as PUCCH formats 1/1a/1b, 2/2a/2b, and 3, or a new format. The PUCCH format may be selected for all PUCCH messages across each of the M allocated PRBs. Alternatively, the PUCCH formats may be multiplexed by the UE by selecting different PUCCH formats in one RB or selecting different PUCCH formats across RBs.

Different PUCCH formats may be selected either semi-statically, based on semi-static assignment data received at the UE from a serving base station or, the UE may select the particular format dynamically. In one example, the UE may compare the number of UCI bits (K) with one or more thresholds to dynamically determine the appropriate PUCCH format to select. In example operation, assuming assignment of 10 PRBs (M=10), if 1<=K<=10, then the UE may select PUCCH format 1a in each or various RBs. If 10<K<=20, then the UE may select PUCCH format 1b in each or various RBs. If 20<K<=110, then the UE may select PUCCH format 2 in each or various RBs. Otherwise, if the number of UCI bits, K, exceeds any of the thresholds beyond a certain amount, the UE may select to drop some of the UCI bits before selecting the appropriate format.

Figure 7B:
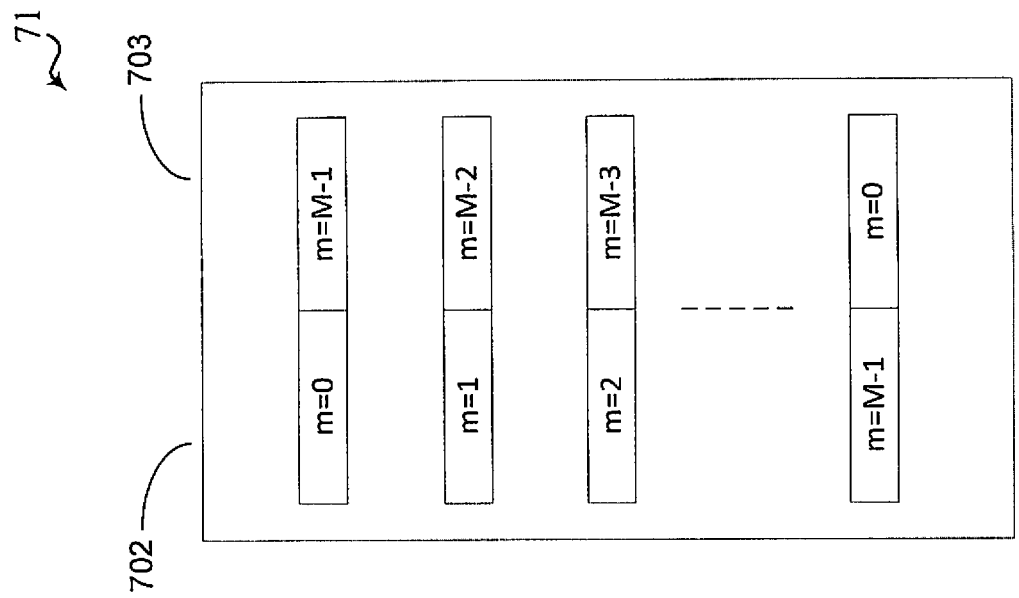
FIGS. 7A and 7B are block diagrams illustrating example transmission designs configured for aspects of the present disclosure.
Figure 7A:
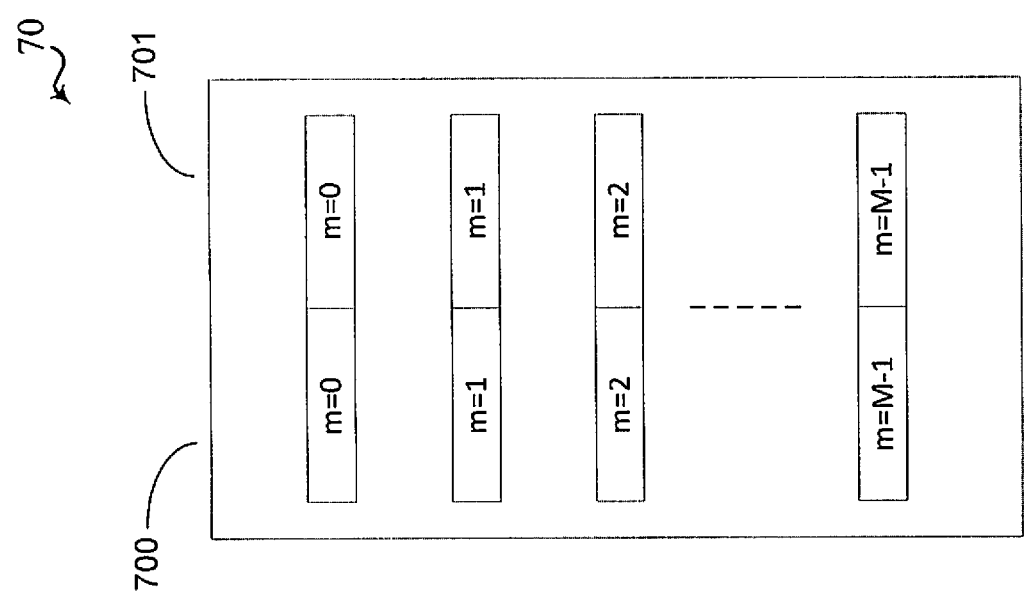

FIGS. 7A and 7B are block diagrams illustrating example transmission designs configured for aspects of the present disclosure. Subframe 70 is divided into two slots, slots 700 and 701. The design according to the first aspect provides for each PUCCH transmission to span slots 700 and 701 in subframe 70 without hopping. As illustrated, the PUCCH transmissions in slot 700 begin at m=0 through m=M−1. The transmission over slot 701 also begins at m=0 through m=M=2, thus, is provided without hopping. The PUCCH transmission design of subframe 71 illustrates hopping across slots 702 and 703. The transmission at slot 702 begins at m=0 through m=M−1, indicating the transmissions over the M allocated PRBs. With the hopping enabled in subframe 71, the transmissions of slot 703 begins at m=M−1 through m=0. Depending on how the UCI is transmitted, the PUCCH transmission design of subframe 70 may have more frequency diversity gain.

Figure 8A:
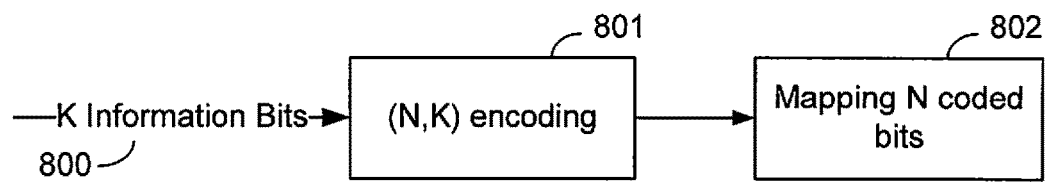
FIGS. 8A and 8B are block diagrams illustrating encoding schemes configured according to one aspect of the present disclosure.
Figure 8B:
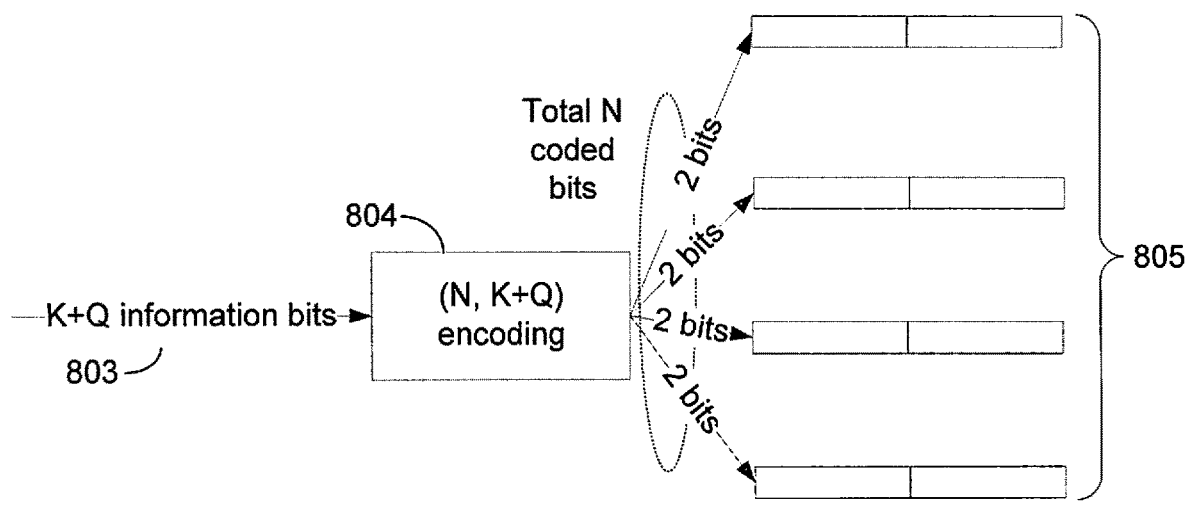

With the increased number of PRBs allocated for PUCCH transmissions in LTE/LTE-A systems with unlicensed spectrum, the total UCI payload size, K, may be encoded into the increased total capacity of the PUCCH channel, N. FIGS. 8A and 8B are block diagrams illustrating encoding schemes configured according to one aspect of the present disclosure. K information bits 800 are encoded at 801 into N coding bits. The N coding bits may then be mapped at 802 to the appropriate location, dependent on the PUCCH format selected.

FIG. 8B illustrates an example aspect in which the PUCCH transmission is based on PUCCH format 1b. With PUCCH format 1b, the capacity N, is 2-bits. Additionally, cyclic redundancy check (CRC) bits, Q, are added to the K information bits for better ACK/NAK detection. Thus, K+Q bits 803 are encoded at 804 into the 2 coding bits capacity of PUCCH format 1b. The mapping 805 of the 2 coding bits for PUCCH format 1b provides for each of the 2 coding bits to be mapped such that each RB carries 2 of the coded bits.

Each PUCCH channel may carry up to M*C bits, where M is the number of PRBs for the PUCCH channel, and C is the capacity per RB. As an example, considering M=10 allocated PRBs, PUCCH format 1/1a may yield a capacity of 10 bits, PUCCH format 1b may yield a capacity of 20 bits. Additional resources may also be allocated for the PUCCH transmissions. Thus, two or more PUCCH format 1b within each RB may yield a total capacity of 20*L bits. Where L is the number of allocated resources in each PRB. For example, a UE may use L=2 PUCCH format 1b resources in each RB. The two resources may be adjacent to each other or with some gap (e.g., max gap with the RB). Similarly, the total capacity under these parameters for PUCCH format 2/2a/2b may yield at least 110 bits, and, for PUCCH format 3 may yield at least 210 bits.

The multiplexing capacity for LTE-U aspects may be the same as LTE on a per RB basis. Thus, for each RB, if PUCCH format 1/1a/1b is used, then up to 36 or 36/L PUCCH channels may be multiplexed. It should be noted that with PUCCH format 1/1a/1b, each additional resource allocated, L, would reduce the maximum multiplexing capacity. When using PUCCH format 2/2a/2b, up to 12 PUCCH channels may be multiplexed. While, with PUCCH format 3, up to 5 PUCCH channels may be multiplexed.

In scenarios with additional interference, it may be desirable to have a self-decodable PUCCH design in each slot of the two slots in a subframe. Thus, the entire PUCCH transmission would be decodable even if only the first slot were received. This self-decoding provides for better interference handling (order-2 interference diversity). With current PUCCH formats, only PUCCH format 1/1a/1b has such a self-decoding property. Thus, either one resource per PRB pair, or two or more resources (L) per RB for PUCCH format 1/1a/1b based transmission, providing capacity up to 2ML bits, where M is the number of RBs. In such aspects, when using existing LTE PUCCH formats, the implementations would refrain from using PUCCH format 2/2a/2b/3 based LTE PUCCH design with unlicensed spectrum.

PUCCH power control for LTE PUCCH designs with unlicensed spectrum may be determined based on both the value of M (allocated PRBs) and the value of K (total number of UCI bits). In applying the PUCCH power control, equal power may be used for all the M PRBs by the UE.

LTE utilizes a number of interference randomization (intra-cell & inter-cell) features for PUCCH operation, which may also be re-used for LTE PUCCH designs with unlicensed spectrum. In particular, additional intra-cell interference randomization can be done within the M PRBs assigned to PUCCH. For example, if two UEs have adjacent cyclic shifts in one RB of the M PRBs, randomization can be applied such that the two UEs will not have adjacent cyclic shifts in a different RB of the M PRBs, such that the intra-cell interference between the two UEs can be randomized. This interference randomization may be applied by using a randomization function for cyclic shifts and/or orthogonal cover (if applicable) across the M PRBs. For inter-cell interference randomization, the UE may use CCA location and/or cell ID and/or RRC configuration to randomize/coordinate PUCCH RBs among different cells/operators.

In LTE, two types of PUCCH resource determination are supported: explicit resource determination, in which the resource for PUCCH is indicated to the UE through an RRC command, and implicit resource determination, in which a UE determines the PUCCH resource based on the starting control channel element (CCE) of PDCCH (or the starting enhanced CCE (ECCE) of EPDCCH).

In various aspects of the present disclosure, LTE PUCCH design with unlicensed spectrum may keep the same explicit and implicit approaches to resource determination. The type of resource determination approach may be selected based on the particular PUCCH format in a given RB, the UCI information type, and possibly the PDSCH transmission type, if applicable. For example, if there are only ACK/NAK transmissions, and there is an EPDCCH associated with the PDSCH transmission, then the UE may select to use implicit resource determination based on the starting ECCE.

For a UE, the PUCCH resource index for each RB with the M PRBs may be the same. Alternatively, the PUCCH resource indices may be different for different RBs, especially when there is some pre-determined relationship among these resource indices for a UE.

Due to increased PUCCH capacity, LTE PUCCH design with unlicensed spectrum may consider multiplexing all of the UCIs onto one PUCCH, or at least, as much as possible, instead of dropping some UCIs based on the LTE rules. As the capacity will not be infinite, there may still be a possibility, or necessity, to drop some UCI in certain scenarios.

UCI may include ACK/NAK, SR, and CSI feedback. For SR, the LTE PUCCH design with unlicensed spectrum may consider more than 1-bit for SR information (similar to a buffer status report (BSR)), in order to expedite UL scheduling. Thus, instead of relying on SR to indicate UL scheduling, and then later on relying on BSR to indicate the actual UL scheduling need, the additional SR bits may provide more information to the base station regarding the status of the UL buffer. In the PUCCH transmission for LTE/LTE-A deployments with unlicensed spectrum, the ordering of UCI may be pre-determined. In one example, the order of transmission may be pre-determined to be the ACK/NAK information, followed by SR, and then followed by CSI.

The LTE PUCCH design with unlicensed spectrum may also consider joint coding that may be performed for all of the scheduled UCIs. In additional aspects the UE may also consider separately coding some UCIs, while jointly coding others. For example, LTE PUCCH design with unlicensed spectrum may provide for jointly coding ACK/NAK and SR (due to similar performance target), and separately coding CSI, which has different performance target than ACK/NAK and SR.

In mapping of the coded UCI, the mapping may also be performed jointly or separately. For example, ACK/NAK and SR may be mapped to M/2 RBs while CSI may be mapped separately to the other half of the M RBs.

LTE/LTE-A systems with unlicensed spectrum may also include carrier aggregation (CA) deployments. In LTE CA systems, PUCCH may be transmitted by a UE from its primary component carrier (PCC). For LTE systems, a single PUCCH is transmitted in the PCC. Moreover, in LTE dual connectivity (e.g., LTE with a non-ideal backhaul between two or more CCs), two or more PUCCHs may be transmitted by a UE from two or more different CCs. In LTE/LTE-A with unlicensed spectrum, a UL CC may not be available due to failed CCA. Having a fixed PCC may imply the frequent unavailability of PUCCH for a UE, which will impact HARQ operation, CSI feedback, SR transmission, etc. Accordingly, various aspects of the present disclosure are directed to determining a PUCCH CC based in part on UL CCA success/failure. Thus, among the successful CCA CCs, the UE may pick one to transmit PUCCH based on various predefined parameters, such as RRC configured cell/CC index, where the lowest cell/CC index would be picked.

FIGS. 9A and 9B are functional block diagrams illustrating example blocks executed to implement one aspect of the present disclosure. At block 900, a UE receives an allocation of resources for uplink control channel transmission. At block 901, the UE generates one or more uplink control channel messages according to at least one control channel format, wherein the one or more uplink control channel messages include K UCI bits. The UE selects a transmission CC, at block 902, from a plurality of CCs, wherein the transmission CC is selected based on a clear CCA detected by the UE. At block 903, after selecting the CC for transmitting the uplink control channel message, the UE transmits the one or more uplink control channel messages to the base station over the allocated resources.

At the base station side, at block 904, the base station identifies one or more clear uplink CCs of a plurality of CCs configured for each UE served by the base station. The base station, at block 905, determines an uplink control CC of the one or more clear uplink CCs on which each UE will transmit an uplink control channel message. The base station then monitor, at block 906, the uplink control CC for the uplink control channel message from each of the UEs.

Figure 10:
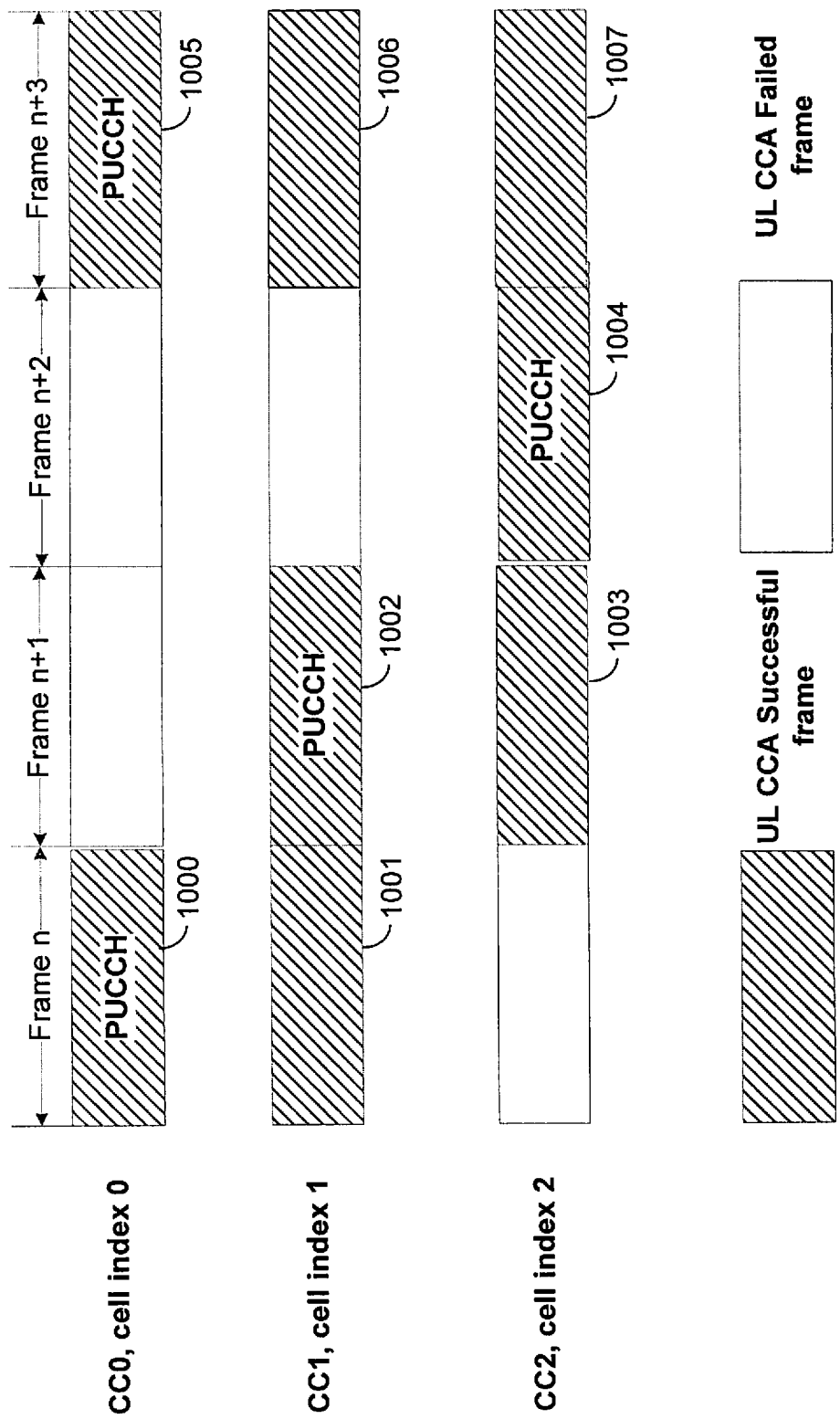
FIG. 10 is a block diagram illustrating three CCs, CC0-CC1, configured for a UE configured according to one aspect of the present disclosure.

As an example, a UE may be configured for three CCs in an LTE/LTE-A communication system with unlicensed spectrum. FIG. 10 is a block diagram illustrating three CCs, CC0-CC1, configured for a UE configured according to one aspect of the present disclosure. The PUCCH CC for the UE may vary over time depending on whether there is CCA success or failure in the frame, which may consist of DL subframe(s), special subframe(s), and UL subframe(s). In frame n, CC0 and CC1 returned clear CCAs, while CC2 failed in the CCA check. The UE evaluates the CC index of both CC0 and CC1 in frame n. As the CC index of CC0 is lower than that of CC1, the UE selects to transmit the LTE PUCCH in frame 1000, instead of frame 1001.

In frame n+1, the CCA checks were clear for CC1 frame 1002 and CC2 frame 1003. After comparing the CC indices, the UE selects CC1 frame 1002 as the PUCCH CC for transmission. At frame n+2, only CC2 frame 1004 passes the CCA check. As such, UE selects to transmit the PUCCH on CC2 frame 1004. Finally, at frame n+3, all of the CCs, CC0-CC2 pass the CCA check at frames 1005-1007. Because CC0 frame 1005 is the lower index, the UE selects CC0 frame 1005 to transmit the PUCCH.

It should be noted that different UEs may still have different PUCCH CCs in the same frame due to different CCA results and/or different RRC configurations (e.g., cell indices can be UE-specifically configured).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 6, 9A, and 9B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method of wireless communication, comprising:
 identifying, by a base station, one or more clear uplink component carriers (CCs) of a plurality of CCs configured for each UE served by the base station;

determining an uplink control CC of the one or more clear uplink CCs on which each UE will transmit an uplink control channel message; and monitoring the uplink control CC for the uplink control channel message from each UE.

2. The method of claim 1, wherein the identifying includes:

monitoring the plurality of CCs for channel usage beacon signals (CUBS) transmitted from each UE, wherein the one or more clear uplink CCs include CUBS.

3. The method of claim 2, wherein the identifying further includes:

in response to detecting CUBS on the one or more clear uplink CCs, detecting demodulation reference signals (DMRS) on the one or more clear uplink CCs.

4. An apparatus configured for wireless communication, comprising:

means for identifying, by a base station, one or more clear uplink component carriers (CCs) of a plurality of CCs configured for each UE served by the base station;

means for determining an uplink control CC of the one or more clear uplink CCs on which each UE will transmit an uplink control channel message; and means for monitoring the uplink control CC for the uplink control channel message from each UE.

5. The apparatus of claim 4, wherein the means for identifying includes:

means for monitoring the plurality of CCs for channel usage beacon signals (CUBS) transmitted from each UE, wherein the one or more clear uplink CCs include CUBS.

6. The apparatus of claim 5, wherein the means for identifying further includes:

means, executable in response to detecting CUBS on the one or more clear uplink CCs, for detecting demodulation reference signals (DMRS) on the one or more clear uplink CCs.

7. A non-transitory computer-readable medium having program code recorded thereon, the program code comprising:

program code for causing a computer to identify, by a base station, one or more clear uplink component carriers (CCs) of a plurality of CCs configured for each UE served by the base station;

program code for causing the computer to determine an uplink control CC of the one or more clear uplink CCs on which each UE will transmit an uplink control channel message; and program code for causing the computer to monitor the uplink control CC for the uplink control channel message from each UE.

8. The non-transitory computer-readable medium of claim 7, wherein the program code for causing the computer to identify includes:

program code for causing the computer to monitor the plurality of CCs for channel usage beacon signals (CUBS) transmitted from each UE, wherein the one or more clear uplink CCs include CUBS.

9. The non-transitory computer-readable medium of claim 8, wherein the program code for causing the computer to identify further includes:

program code, executable in response to detecting CUBS on the one or more clear uplink CCs, for causing the computer to detect demodulation reference signals (DMRS) on the one or more clear uplink CCs.

10. An apparatus configured for wireless communication, the apparatus comprising:

at least one processor; and a memory coupled to the at least one processor, wherein the at least one processor is configured:

to identify, by a base station, one or more clear uplink component carriers (CCs) of a plurality of CCs configured for each UE served by the base station;

to determine an uplink control CC of the one or more clear uplink CCs on which each UE will transmit an uplink control channel message; and to monitor the uplink control CC for the uplink control channel message from each UE.

11. The apparatus of claim 10, wherein the configuration of the at least one processor to identify includes configuration of the at least one processor to monitor the plurality of CCs for channel usage beacon signals (CUBS) transmitted from each UE, wherein the one or more clear uplink CCs include CUBS.

12. The apparatus of claim 11, wherein the configuration of the at least one processor to identify further includes configuration, executable in response to detecting CUBS on the one or more clear uplink CCs, to detect demodulation reference signals (DMRS) on the one or more clear uplink CCs.

* * * * *